UNITED STATES PATENT OFFICE.

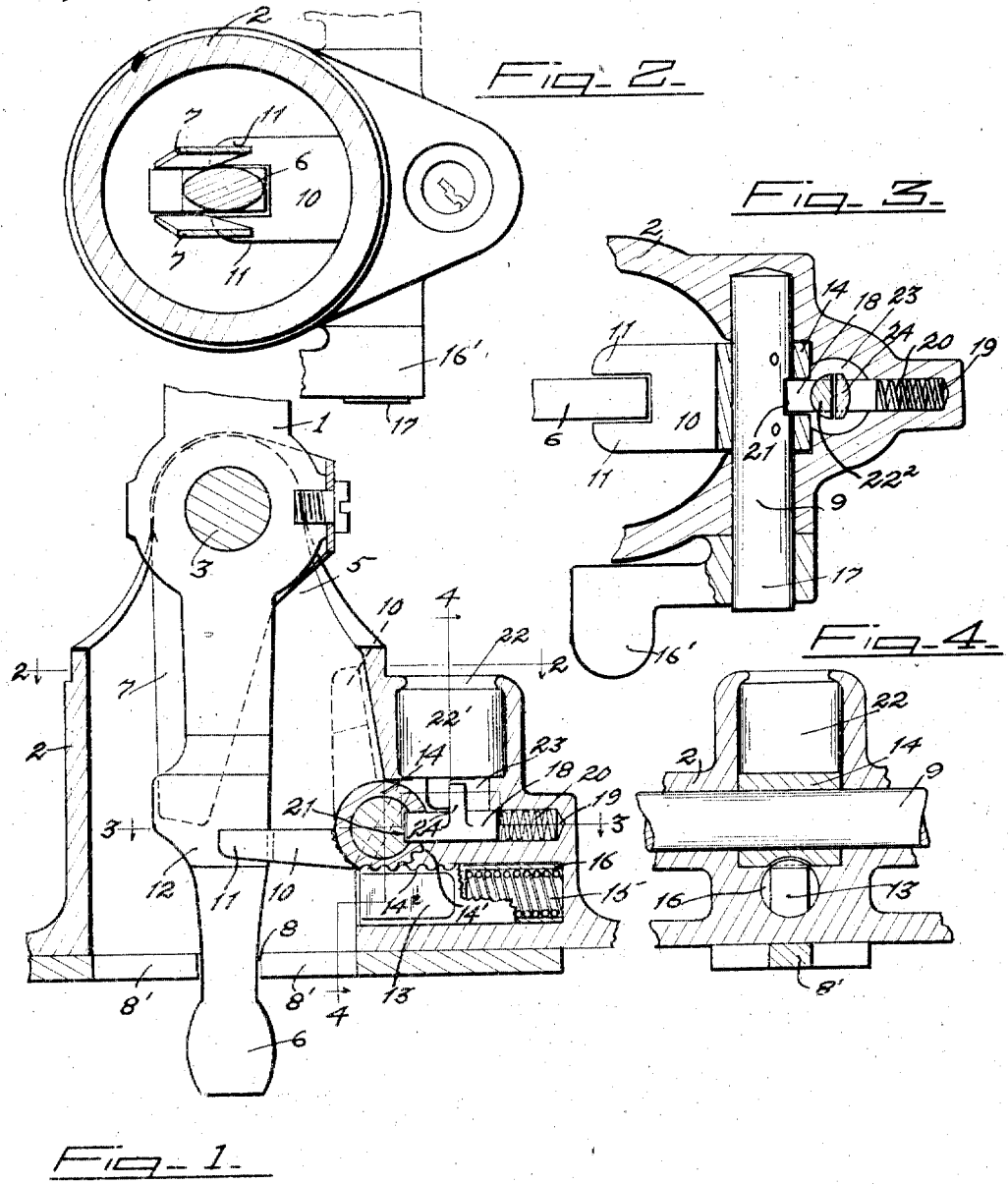

GEORGE C. JENSEN, OF OAKLAND, CALIFORNIA.

MECHANISM FOR LOCKING LEVERS.

1,235,034.  Specification of Letters Patent.  Patented July 31, 1917.

Application filed November 28, 1916. Serial No. 133,884.

*To all whom it may concern:*

Be it known that I, GEORGE C. JENSEN, a citizen of the United States, residing at Oakland, in the county of Alameda and State of California, have invented certain new and useful Improvements in Mechanism for Locking Levers, of which the following is a specification.

The present invention relates to a locking mechanism for movable levers and is particularly adapted for application to control levers of a motor vehicle.

The principal object of the invention is to provide a device which may be easily installed in connection with levers used extensively for shifting the variable speed gears of motor vehicles, and the general advantage to be gained by the use of the present invention is the locking of the gear shift lever of a motor vehicle in its neutral position to prevent the movement of the vehicle under its own power without interfering with the movement thereof by hand, as, for example, when it is desired to move the vehicle from place to place in a garage.

The invention consists broadly in a means for engaging the shifting lever when the same is in its neutral position, to lock the lever from lateral movement within its transverse shifting slot, the lever locking means having mechanism associated therewith which automatically engages the same to prevent it from being released from operative movement.

To more fully comprehend the invention, reference is directed to the accompanying drawings, wherein—

Figure 1 is a central longitudinal sectional view of the preferred embodiment of my lock, as applied to a well known type of motor vehicle gear shift lever.

Fig. 2 is a sectional view taken on line 2—2 of Fig. 1, and viewed in the direction of the arrows.

Fig. 3 is a sectional view taken on line 3—3 of Fig. 1, and viewed in the direction of the arrows.

Fig. 4 is a sectional view taken on the line 4—4 of Fig. 1, viewed in the direction of the arrows.

In the drawings, the reference numeral 1 designates a lever of a type commonly used on motor vehicles, at the upper end of which is a handle, not shown in the drawings. Said lever 1 is arranged for swinging movement in two parallel planes and for this purpose is freely fulcrumed upon a horizontal shaft 3, the latter being fixed in the fixed arms or brackets 5 extending upwardly from a tubular housing or member 2 supported in any suitable manner.

The lower end 6 of the lever 1 is shown in Fig. 1 of the drawings as adapted for engagement with the shifter rods of a sliding gear mechanism, said shifter rod and mechanism being well known in the art, and are therefore not illustrated in the drawings. The usual spring for holding the lever 1 in its vertical position laterally, is shown at 7, to normally maintain the lower end of the lever, when in neutral position, in the opening 8 between the meeting ends of arms 8', the opening 8 being so disposed as to necessitate a transverse moving of the lever to neutral position before the same can be moved laterally for operation in different parallel planes one at either side of the arms 8' as in Fig. 4 of the drawings.

Fixed at one end to rotate with the longitudinal shaft 9, which is rotatably mounted at its ends in the member 2 at one side of the tubular portion thereof, is a locking arm 10, provided at its free outer end with the outwardly projecting spaced retaining fingers 11, one of which is adapted when the arm is in locking position, as in Figs. 1, 2 and 3 of the drawings, for projecting beyond the opposite sides of the flattened portion 12 on the lever 1 below the fulcrumed point thereof, and lock or retain the lever in neutral position within said opening 8. The ends of the arms 8' prevent the moving of the lever 1 forwardly or rearwardly and the fingers 11 prevent lateral movement thereof when the locking arm is in operative position. A horizontal reciprocating plunger 13, mounted in a bore in the member 2 beneath the shaft 9 has engagement at its outer end with the hub 14 of the locking arm 10, through the coöperating teeth 14' and 14² formed respectively on the hub and plunger. The plunger 13 is normally forced outwardly by a coiled spring 15 receivable in a recess 16 in the rear of the plunger and abutting against the rear wall of the bore within which the plunger is mounted, to cause the locking arm 10 to assume the position in dotted lines Fig. 1, which permits a free movement of the lever 1.

The locking arm 10 is thrown downwardly to locked position as in full lines in Figs. 1, 2 and 3 of the drawings by the operation of a foot controlled lever or pedal 16' positioned exteriorly of the member 2 and fixed to the projecting end 17 of the shaft 9. The lever or pedal 16' lies parallel with the locking arm 10, and a slight downward pressure on the pedal or lever 16' rotates the shaft against the action of the spring pressed plunger 13 and moves the locking arm from dotted to full line position as in Fig. 1.

The arm 10 is locked in its lowered position by a latch member 18 slidably mounted in a guide 19 above the plunger 13 and normally forced outwardly into frictional contact with the hub 14 of the arm 10 by a spring 20. The hub 14 and shaft 9 are provided with alined openings 21 for receiving the outer end of the locking bolt 18 when the lever is in its depressed or lowered position, as in Figs. 1, 2 and 3, said latch preventing the raising of the arm to release the lever 1, except in a hereinafter described manner.

The member 2 is provided above the latch 18 with an opening 22 adapted to rotatably mount a lock barrel 22', carrying on its base a lug 22², and said opening 22 is provided in its base with a slot 23 communicating with the guide 19 and outwardly through which projects a tongue or lug 24 for coöperation with the lug 22² and said lug 24 is adapted to be operated by the rotation of the lock barrel and reciprocated rearwardly when it is desired to remove the forward end of the latch 18 from the opening 21.

It is apparent when it is desired to lock the lever 1, when the vehicle driving gears are in disengaged relation and the lever is in neutral position, it is only required that the operator depress the pedal 16' which causes the arm 10 to swing downwardly with one of the fingers 11 on either side of the lower portion of the lever, as in Fig. 1 of the drawings, at which time the latch 18 forced outwardly by the spring 20 slips into the opening 21 in the hub of the arm 10 locking the arm in its lowered position. When it is desired to release the lever, the operator, by a suitable key or other means not shown, operates the lock barrel within the opening 22 which withdraws the bolt 18 from the opening 21, permitting the plunger 13 to disengage the arm 10 from the lever and to restore the same to the dotted line position— Fig. 1, where it is held by the tension of the spring 20 until such time as it is again normally depressed.

Having thus described my invention, what I claim as new and desire to protect by Letters Patent is:—

1. In combination with a support, a lever mounted therein and fulcrumed for movement relatively thereto, a pivotally mounted locking means carried by the support and normally without the path of movement thereof and capable of pivotal movement to a point within the path of movement of said lever to lock the lever from movement relative to its stationary support, mechanism carried by said support for automatically engaging and for locking said lever locking means when moved to locked position, and lock controlled means for releasing said lever locking mechanism.

2. In combination with a support, a lever mounted therein and fulcrumed for movement relatively thereto, a rotatably mounted locking arm, carried by the support and normally without the path of movement thereof and capable of rotatable movement to a position within the path of movement of said lever to lock the lever from movement, a latch for engaging said lever locking arm when the same is in its operative position to prevent the movement thereof from said lever, and lock controlled means for releasing said latch.

3. In combination with a movable lever, a means normally lying without the path of movement thereof and capable of rotatable movement to a position within the path of movement of said lever to lock the lever from movement, spring pressed means for normally retaining said lever locking means without the path of movement of the lever, manually operated means for rotating said means to throw the same within the path of movement of the lever to lock the same from movement, a latch member for automatically engaging and locking said lever locking means in its operative position, and lock controlled means for releasing said latch member.

4. In combination with a lever fulcrumed for movement in two parallel planes, a lever locking means normally lying without the path of movement of said lever and capable of pivotal movement to a position within the path of movement thereof to lock the same from movement, a latch member for automatically engaging the lever locking member to retain the same in its locked position, lock controlled means for releasing said latch member, and means coöperating with and adapted for automatically throwing said lever locking means to its normal position without the path of movement of the lever on the release of said latch.

5. In combination with a support, a lever mounted thereon and fulcrumed for movement in two parallel planes, a lever locking means pivotally carried by said support and normally lying without the path of movement of said lever and capable of manual operation for movement to a position within the path of movement of said lever to lock the same from movement, a reciprocating spring pressed latch member for automatically engaging the lever locking means to retain the same in its locked position, lock controlled means for releasing said latch member, and spring pressed reciprocating means for automatically throwing said lever locking means to its normal position without the path of movement of the lever on the release of said latch member.

In testimony whereof I have signed my name to this specification in the presence of two subscribing witnesses.

GEORGE C. JENSEN.

Witnesses:
HARRY A. TOTTEN,
D. B. RICHARDS.